(12) United States Patent
Riedel

(10) Patent No.: US 8,968,570 B2
(45) Date of Patent: Mar. 3, 2015

(54) FLOATABLE OIL ABSORBER, ITS USES, AND ITS METHOD OF MANUFACTURE

(71) Applicant: Winfried A. Riedel, Zamarramala (ES)

(72) Inventor: Winfried A. Riedel, Zamarramala (ES)

(73) Assignee: Oil Clear Europe Ltd., Hertfordshire (GB)

( * ) Notice: Subject to any disclaimer, the term of this patent is extended or adjusted under 35 U.S.C. 154(b) by 0 days.

(21) Appl. No.: 14/073,632

(22) Filed: Nov. 6, 2013

(65) Prior Publication Data

US 2014/0124427 A1    May 8, 2014

Related U.S. Application Data

(60) Provisional application No. 61/722,883, filed on Nov. 6, 2012.

(51) Int. Cl.
| | | |
|---|---|---|
| *B01D 15/00* | (2006.01) | |
| *C02F 1/28* | (2006.01) | |
| *E02B 15/10* | (2006.01) | |
| *B01J 20/28* | (2006.01) | |
| *C02F 1/68* | (2006.01) | |
| *C02F 101/32* | (2006.01) | |

(52) U.S. Cl.
CPC ........... *C02F 1/285* (2013.01); *B01J 20/28038* (2013.01); *C02F 1/681* (2013.01); *C02F 2101/32* (2013.01); *Y10S 210/924* (2013.01)
USPC ........... 210/693; 210/671; 210/680; 210/690; 210/692; 210/924

(58) Field of Classification Search
CPC .... C02F 1/681; C02F 1/281; C02F 2103/007; C02F 2101/32; B01D 17/0202; B01D 15/00; B01D 17/0214; B01F 13/0049; E02B 15/04; E02B 15/045; E02B 15/101; E02B 15/102
USPC ................. 210/671, 680, 690, 691, 692, 693, 210/747.1, 747.6, 242.2, 922, 923, 924, 232
See application file for complete search history.

(56) References Cited

U.S. PATENT DOCUMENTS

| | | | |
|---|---|---|---|
| 3,679,058 A | | 7/1972 | Smith |
| 3,702,657 A | | 11/1972 | Cunningham et al. |
| 3,849,241 A | | 11/1974 | Butin et al. |
| 3,904,528 A | | 9/1975 | Yocum |
| 4,111,813 A | | 9/1978 | Preus |
| 5,281,463 A | * | 1/1994 | Cotton ......................... 428/126 |
| 5,676,839 A | | 10/1997 | Shippert |
| 5,688,075 A | * | 11/1997 | Gradek ........................... 405/63 |
| 5,779,392 A | * | 7/1998 | Mendes ........................... 405/63 |
| 5,885,451 A | * | 3/1999 | Porrovecchio, Sr. ....... 210/242.4 |
| 6,506,307 B1 | | 1/2003 | Hondroulis et al. |

FOREIGN PATENT DOCUMENTS

| | | |
|---|---|---|
| CA | 2085951 | 2/1993 |
| DE | 69201444 | 6/1995 |
| GB | 2276331 | 9/1994 |
| WO | 9304236 | 3/1993 |
| WO | 9423815 | 10/1994 |
| WO | 2012085705 | 6/2012 |
| WO | 2012136225 | 10/2012 |

\* cited by examiner

*Primary Examiner* — Nam Nguyen
*Assistant Examiner* — Claire Norris
(74) *Attorney, Agent, or Firm* — Park, Vaughan, Fleming & Dowler LLP

(57) ABSTRACT

A floatable modular device for absorbing oil from a surface, includes a generally disk-shaped floatable cage tapering towards the periphery of the cage in a peripheral region thereof; and a water-repellent strip-shaped oil absorbent accommodated in the cage, wherein the cage further includes at least one connector element configured for joining plural ones of the modular devices together, to form an articulate oil absorber in which the individual cages are oriented in parallel to one another. A method of manufacturing the device includes providing a first, grid-like sheet made of plastics, positioning a water-repellent strip-shaped oil absorbent on the first grid-like sheet, positioning a second sheet on the oil absorbent, and welding the first and second sheets together at their peripheries, with the oil absorbent in between, wherein peripheral regions of the first and second sheets are bent towards one another.

20 Claims, 4 Drawing Sheets

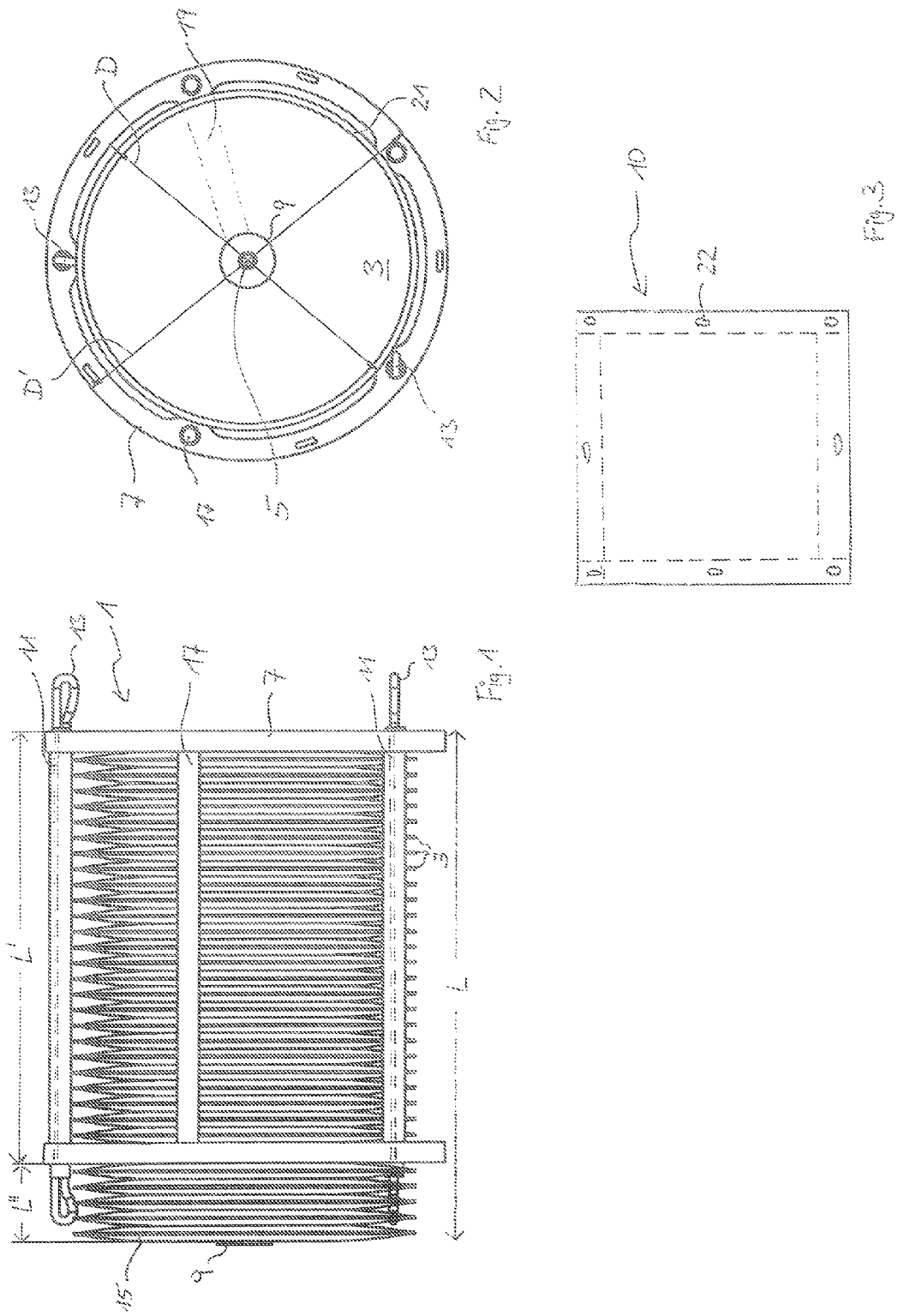

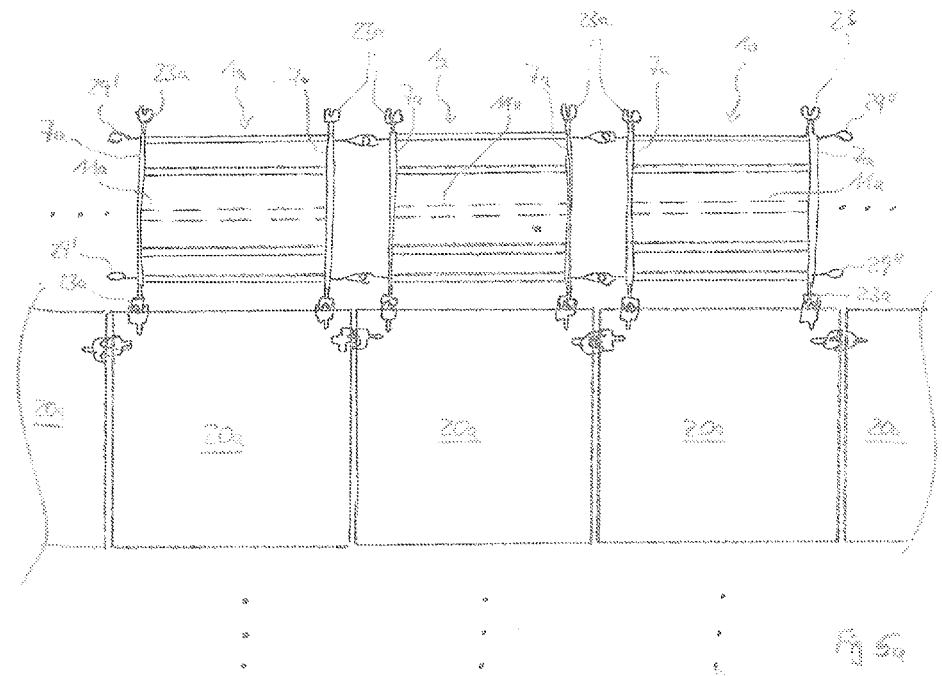
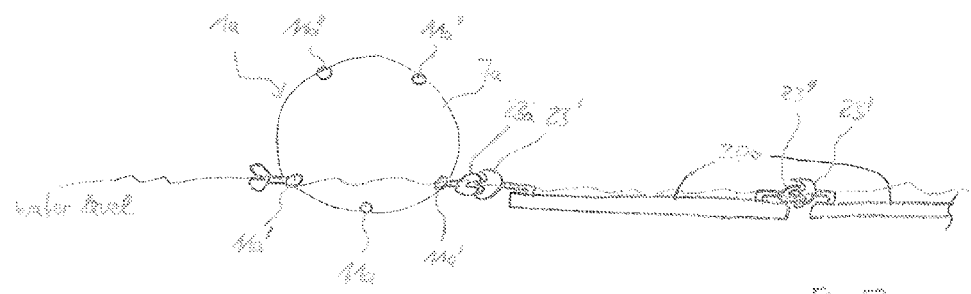

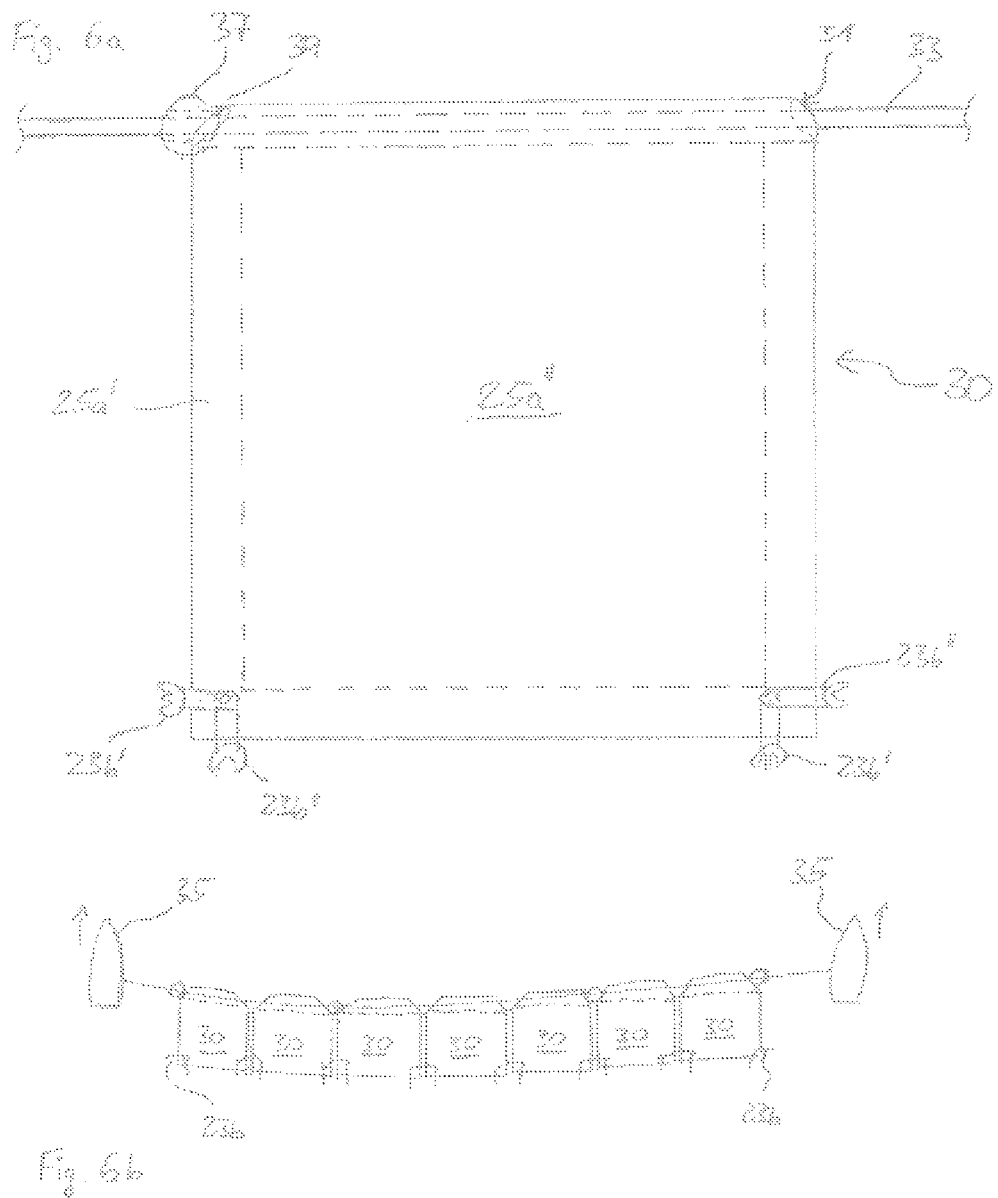

FLOATABLE OIL ABSORBER, ITS USES, AND ITS METHOD OF MANUFACTURE

RELATED APPLICATION

This application claims priority under 35 U.S.C. §119 to U.S. Provisional Application No. 61/722,883, entitled "Floatable Oil Absorber, Its Uses, and Its Method of Manufacture", by Winfried A. Riedel, filed 6 Nov. 2012, the contents of which are herein incorporated by reference in their entirety.

The present invention relates to certain floatable devices for absorbing spilt oil from a surface, in particular a water surface. It also relates to the use of the floatable devices for absorbing spilt oil and to a method of manufacturing such floatable devices. It further relates to an absorber material.

It is well known that during marine oil well drilling, oil production, and oil transportation operations the possibility exists for oil to be spilt, which will then float as a film on the water, being subject to drifts and currents which may eventually wash the spilt oil or a less volatile part of it ashore.

Previous proposals to deal with spilt oil on beach or water surfaces include so-called booms, i.e., floatable tube-like structures having an oil absorbing material disposed near their circumference (e.g., WO 93/04236 A1). Such booms have primarily a barrier effect, in that they separate the contaminated water surface from clean areas; their supposed secondary effect is to absorb oil coming into contact with the booms. In actual practice, the effectivity of known booms is unsatisfactory, however.

It is also known in principle, to drop hydrophobic mats onto oil contaminated water or other surfaces, and to recollect such mats after some time (e.g., U.S. Pat. No. 6,506,307 B1). Again, in actual practice, it has become clear that it is quite ineffective to deal even with a medium-sized marine oil spill in this manner.

It is an object of the present invention to suggest a product, a device, its uses, and its method of manufacture, with which the detrimental effects of marine oil spills can be reduced in a more effective manner. This is accomplished by the product, the devices, the method of manufacture, and the uses of present invention as follows:

According to a first aspect, a fibrous oil-absorbing material is cut as strips from a melt-blown polyolefin master web. The strips are generally several centimeters in length, several millimeters in width, and around 1-3 millimeters in thickness. As the melt-blown web comprises the water-repellent polyolefin fibers in an entangled fashion, the strips will not allow water to enter between the fibers when disposed on a water surface or when immersed in water. By contrast, any oil coming into contact with the strips will displace the air present between the fibers, and will be absorbed by the strip, thereby considerably reducing the overall buoyancy of the oil absorbent material, but still floating on water. According to embodiments, polyethylene, polypropylene or mixtures of these are employed. The aspect ratio (length divided by circular equivalent cross-sectional diameter) may be between 10 and 1000, and the circularity (smallest diameter divided by largest diameter) is in embodiments between 0.1 and 0.99.

According to a second aspect, a device for absorbing oil from a surface is modular and floatable, and comprises a generally disk-shaped floatable cage tapering towards the periphery of the cage in a peripheral region thereof, and a water-repellent strip-shaped oil absorbent accommodated in the cage. The cage further comprises at least one connector element configured for joining plural ones of the modular devices together, to form an articulate oil absorber in which the individual cages are oriented in parallel to one another.

In embodiments, the at least one connector element includes connecting structure configured to support the plural ones of the cages in a non-coplanar, face-on manner as a stack, in which stack the peripheral regions of the mutually adjacent cages form a corrugated envelope. In one example, each cage may have a central eye, and all cages are arranged on a common rod or tube passing through the eyes. The cages may be round, or generally polygonal.

In embodiments, a stack of mutually connected devices results, wherein the stack may include connecting structure configured to connect a top or bottom of the stack to the top or bottom of an adjacent, like stack in an end-on fashion. In this manner, a chain of stacks can be formed, each stack constituting a member of the chain. In some embodiments, a cushion may be interposed between the connected stacks. E.g., a smaller number of disks than the number accommodated in each stack may be arranged between adjacent stacks, to form such a cushion, allowing some relative bending of the connected stacks.

In another embodiment, there are plural connector elements on each modular device, each configured to be joined with a corresponding connector element of an adjacent, like modular device in a coplanar, edge-on fashion, to form a one- or two-dimensional array, in which array each modular device has a generally polygonal disk shape, such as rectangular or square.

In this embodiment, each modular device takes the shape of a mat, with plural connectors arranged around its periphery. E.g., the rims may be folded in the region where the connectors are attached to provide enhanced stability. Neighboring mats can then be connected by corresponding connectors such as ones made of a plastic material, to form an array of mats matching e.g. the size of the oil spill. The matching connectors may be arranged radially outward, or in some embodiments, lengthwise on the circumferential rim sufficiently close to the nearest corner that the interlocking portion of one of the connectors (e.g. the male part) extends beyond the corner, while its matching (female) counterpart on the adjacent mat extends almost up to the corner. It is contemplated that on a square mat, there are four male connectors arranged in a handed fashion, e.g. all of them on leftmost (or alternatively, rightmost) ends of each edge and four female connectors arranged on rightmost (or leftmost, respectively) corners. In this manner, adjacent mats always fit. In some other embodiments, the male and female connectors are distributed in some other orderly fashion, potentially requiring some rotating of mats to make adjacent ones fit each other.

In an embodiment, a stack of mutually connected modular devices of this sort is formed before actual use, wherein connected adjacent ones of the generally polygonal modular devices are folded upon one another in a direction transverse to the plane of the modular devices. Usually, the devices are placed horizontally, and stacked vertically. Naturally, such a stack may also be disposed horizontally, with the individual modules arranged vertically.

The stability of the individual modules may in some embodiments be enhanced by providing, in a central region thereof, a direct connection between the opposing grid faces, such as pointwise, or in a pair of closely neighboring, yet spaced-apart points, or a short length between such points, or even a circular connecting feature having an opening operable to receive a connecting rod or rope.

According to another aspect, a method of manufacturing a floatable modular device for absorbing oil from a surface comprises providing a first, grid-like sheet made of plastics, positioning a water-repellent strip-shaped oil absorbent on the first grid-like sheet, positioning a second sheet on the oil absorbent, and then welding the first and second sheets together at their peripheries, with the oil absorbent in between, wherein peripheral regions of the first and second sheets are bent towards one another. Depending on which device is to be manufactured, the sheets may be round (circular or oval) or polygonal (such as square or hexagonal). Both sheets may be grid-like, or else only one of them, the other being oil-impervious, for certain on-shore applications.

According to a further aspect, the stack of mutually connected modular devices may be used for absorbing oil spilt on a water surface, comprising connecting plural ones of the stacks as a chain and disposing the chain onto a part of the water surface in a vicinity of the part of the water surface on which the oil has been spilt. In embodiments, the oil has a drift direction, and the chain is disposed transverse to the drift direction, wherein the stacks are oriented such that the individual cages are oriented such that their thickness directions extend transverse to the drift direction of the spilt oil. In this manner, the chain may serve as a barrier to the oil, while the water may flow relatively freely through the vertically arranged cages, in this way enhancing the amount of oil absorbed as compared to a structure which also blocks the flow of water. The drift direction may result from a radial motion of the oil away from the source of the spill, and/or a linear motion due to a current or wind action. Usually, near a coastline the drift direction is transverse to the coastline, eventually washing spilt oil ashore.

According to a yet further aspect, a stack of mats is used for absorbing oil spilt on a water or coastline surface, comprising unfolding the stack and disposing the mats as a one-dimensional or two-dimensional interconnected flat array onto the spilt oil or onto a coastline area to be protected from the spilt oil. In the former case, each modular device may have two cage faces made of grid-like sheets, such that the oil absorber is accessible to the oil from both faces, and the stack is used on a water surface on which oil has been spilt. In this manner, both oil from underneath and oil sprayed on the top surface by wave and wind action can be absorbed. In the latter case, each modular device has one cage face made of a grid-like sheet, the opposing cage face made of an oil-impervious sheet, such that the oil absorber is accessible to the oil from only one face, and the stack is used on a coastline surface on which no oil has yet been spilt, with the oil-impervious face down and the grid-like face up so as to protect the coastline surface from oil to be washed ashore.

In embodiments, the absorbent material and/or shape and/or the number of cages per stack is selected in dependence of the oil grade. E.g., more viscous oil may call for fewer disks per stack, and/or less absorbent per module, and vice versa. Additionally or alternatively, the ambient temperature when used may be employed to select the absorbent material.

In further embodiments, the disposed modular devices are later recollected along with the absorbed oil. Furthermore, the modular device may be burnt together with the absorbed oil so as to release thermal energy, and a part of the thermal energy so released may be converted into electrical or mechanical energy.

The invention will now be described with respect to the accompanying drawings:

FIG. 1 shows a stacked-disks module according to a first embodiment;

FIG. 2 shows an end-on view of the module of FIG. 1;

FIG. 3 shows a module according to a second embodiment;

Figure 4:
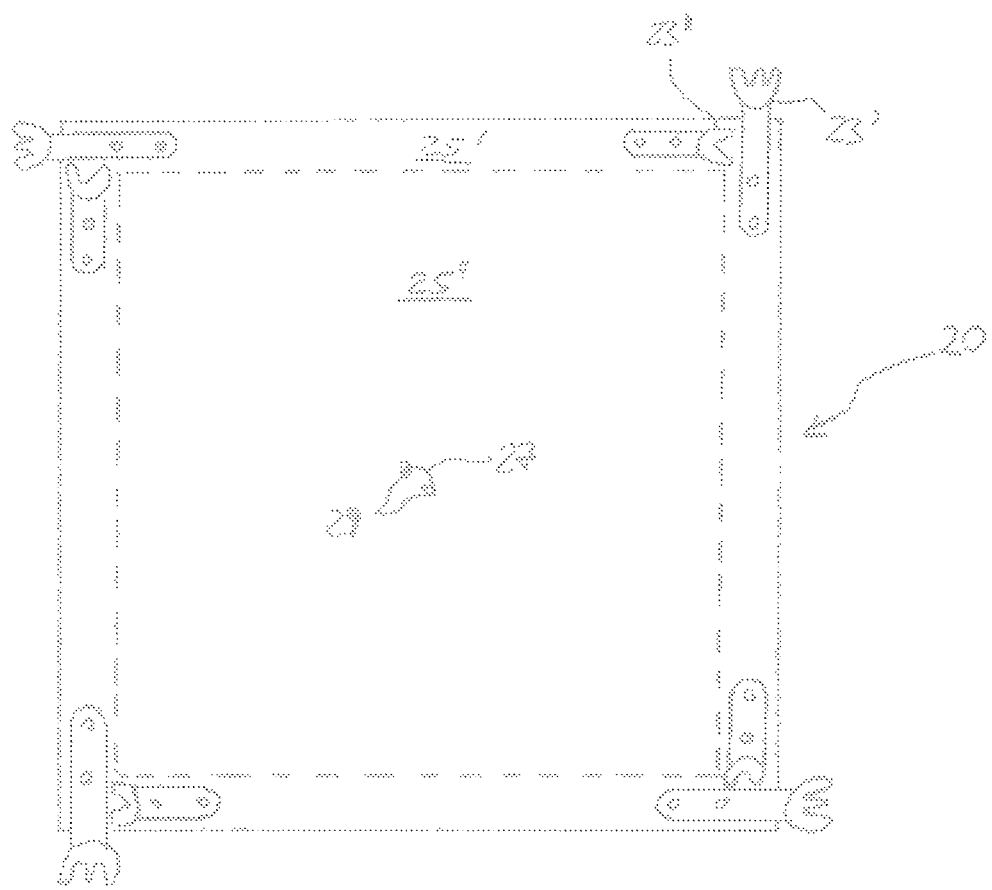
FIG. 4 shows a variant of the second embodiment with plural connectors.

FIGS. 5*a,b* shows interconnected modules of the first and second embodiments, from above and in cross-section; and FIGS. 6*a,b* show another variant of the second embodiment (6*a*) for use together with a dragging cable (6*b*).

According to the first embodiment of FIG. 1, a number of 15-25 individual disks 3 is stacked on a common center rod or tube 5, to form a generally cylindrical module 1.

The stack is held together by end grids 7, which end grids are in turn connected by a number of 3-8 outer tubes 17 (in the example, 5 tubes are shown). The end grids 7 may have a star shape as shown (with 5 radial struts 19, one of which is shown dashed). The end grids may be made of a solid, hollow, or porous plastic material. The center tube may be replaced by a rope tightened between the end grids, which in turn may be replaced by disks or concentric rings.

With respect to FIG. 2, each individual disk 3 is round in shape and doughnut-shaped in cross section, having an outer peripheral region in which the thickness gradually tapers towards the rim. Each disk has faces made of grid-like polyethylene sheets, and an interior made up of polypropylene (and/or polyethylene) non-woven (such as melt-blown) web strips. The polyethylene grids may have a weight of 300-400 $g/m^2$, with openings of 3-10 mm mean size, and/or 5-12 mm pitch; or 5-8 mm mean size and/or 7-10 mm pitch. The strips may be 40-120 mm or 70-100 mm in length, 3-5 mm in width, and 0.5-2 mm in thickness. Generally, the width/thickness ratio is in the range 1.5-10, with 3-5 preferred. In one variant, the non-woven polyolefin material is relatively thin, having an area weight of about 120 to 240 $g/cm^2$ and is cut into elongated strips, the aspect ratio (length divided by equivalent diameter, i.e. the diameter of a circle having the same area as the cross-section) of which is more than 5 or even 8. The circularity (the ratio of the minimum diameter to the maximum diameter at some cross-section; equals 1 for a cylinder) of such strips may be in the range of 0.2 to 0.95. In another variant, a thicker non-woven polyolefin material having an area weight of more than 240 to 480 $g/cm^2$ is cut into polygonal, pointed chips of a generally oblate shape. In this case, the ratio of the equivalent diameter of the chips to their thickness ("platyness") is at least 5, or more than 8. It seems that such polygonal, in particular trigonal or quadricgonal chips tend to form large spaces between each other, into which spaces water can flow and can transport any oil to the absorbing chips. For this to occur, it is desirable if at least two corners of each chip have angles of not more than 100°, or less than 75°. Suitable shapes are substantially equilateral triangles, trapezoidals, parallelograms, diamond shapes, squares and rectangles. If pentagons, hexagons or higher polygons are employed, it is preferred that irregular or non-regular shapes with at least two acute angles are chosen.

While the size D of the disks depends on the intended use, it has been found that 30-100 cm is most useful, with 40-70 cm preferred. The overall diameter D' of the module will be slightly larger, by about 5 to 10 cm. The strip-shaped absorber material (250-350 g for a 50-60 cm sized disk) allows for a loose packing avoiding dense clots. Therefore, water may pass relatively unrestrictedly through the bulk of the module, the created turbulence carrying the oil to the absorber. Around the central opening, the front and back grids may be welded together, or connected by some connecting structure as e.g. a plastic bushing, or in embodiments can be left unconnected if the size of the opening sufficiently closely matches the outer diameter of the rod, tube or rope inserted into it so that the absorbent strips (or chips) cannot pass through any gap formed.

The method of manufacturing the individual disks includes placing a suitable amount of the oil absorbent polypropylene (and/or polyethylene) strips (or chips) onto a lower grid-like polyethylene sheet, then placing a like sheet on top, and welding the sheets together at their peripheral rims 21. The amount of the strips is such that a center thickness of each disk is about 2 to 5 cm.

In some embodiments, the central opening is then punched with or without forming a weld or other connection between the upper and lower grids. In other embodiments, the central openings are formed before the welding together of the grids, or at the same time.

In the embodiment shown in FIG. 1, 25 disks are housed inside each module 1, with 5 further disks 15 mounted on an outward extension of the center rod 5, held by an end disk 9 of the rod. Two cables 11 (polypropylene) with hooks 13 are led through two (non-adjacent ones) of the 5 outer tubes 17, for connecting adjacent modules 1 to one another. In the connected state, the 5 external disks 15 fill the space between adjacent modules 1. In this manner, a chain of modules 1 can be disposed transverse to the expected drift of spilt oil, the oil everywhere encountering an oil absorbing module 1. A typical size of a module would be 0.5 m to 1 m in length L including the 10-20 cm extension L" for the outer disks 15 (length of main body L'=L−L").

Each module of this type can absorb more than 100 l and up to 150 l of oil, e.g. 110-120 liters for a module 60 cm in diameter and 75 cm in length, weighing only 12 kg dry. It may be noted that on account of the low density of the plastic material of 950-965 kg/m$^3$ and the air entrapped between the fibers the inventive structures have sufficient buoyancy to float even in fresh water, more so in salt water. The bulk of the structures will, however, gradually sink below sea level as oil is absorbed and entrapped air is displaced, and therefore is able to continue absorbing oil from the water passing through it, while no oil can pass through underneath the modules.

In the second embodiment of FIG. 3, a generally rectangular or square mat 10 is shown, with top and bottom sheets of the same grid-like polyethylene material as described above, and also the same filling of oil absorbing polypropylene strips. In this example, the rims of the pillow are folded (indicated by dashed lines), and eyes (circular or oval as shown) formed therethrough to provide connectability. Welding the rims may be dispensable where the eyes 22 are configured to secure the rims against unintended reopening. Folding the rims may also be dispensable where the weld connection is sufficiently sturdy in itself, or is enhanced by connectors attached to the unfolded rims. Such connectors are described below.

Such mats 10, the size of which may vary e.g. between 50 cm and 100 cm side length, can easily be interconnected to form a two-dimensional array of in principle unlimited size. In one approach, such interconnected mats are folded atop one another in the shape of a stack, ready to be unfolded when used. In this manner, it is possible to quickly dispose large numbers of mats onto an oil-contaminated water surface or beach area, while still being able to later recollect the oil-filled mats as easily. Each mat of this type, containing about 2 kg/m$^2$ of absorbing material, may absorb more than 10 l and up to 20 l of oil, e.g. 16 l per m$^2$.

In the embodiment of FIG. 4, there are two connectors (male 23' and/or female 23") on each side of a polygonal mat 20, for providing a connection across the edge. In one example, one (male) connector 23' extends beyond the edge, and one (female) connector 23" extends only almost up to the edge of the mat 20. In another example, there are two or three male connectors on each one of opposing edges, and two or three female connectors on the other opposing edges. Other regular arrangements are also possible. In the embodiment shown, the peripheral parts 25' are welded together, the central region 25" being stuffed with the absorbing material strips or chips described above, in a non-ordered and non-compressed fashion, so that large interstices are deliberately formed between the strips (or chips). Bending of the strips is desirable, as long as the strips entangle. In the embodiment shown, there is also a central loop 27 formed through holes 29 in the bottom sheet and through the top grid, in order to provide enhanced stability and keep the absorber filling (in area 25") in place during handling of the mat 20.

It is also contemplated to use mats of this type together with the modules, in order to absorb the spilt oil when it has accumulated upwind (or upstream) of a chain of the modules of the invention. In a variant, the mats are connected downstream (or downwind) of the chain of modules to absorb any oil passing by (or under, or over, or through) the chain, as in FIG. 5. The modules 1*a* are individually connected to mats 20*a*, and are also interconnected by e.g. hooks 29' and rope loops 29". In order to provide this connectability, matching connectors 23*a* are not only provided on the mats 20*a*, but also on the modules 1*a*. Although not all the connectors are shown on the mats 20*a* in this drawing, the skilled person will understand that plural rows of mats 20*a* may be employed if desired (indicated by dots). In FIG. 5*a*, which is a top view, one of the peripheral tubes 11*a* is shown dashed, to indicate that it is lowest. In the side view of FIG. 5*b*, it is indicated that the interconnection of the modules 1a is provided via tubes 11*a'*, e.g. by ropes slipped therethrough, the ropes connecting the hooks 29' and loops 29" shown in FIG. 5*a*. FIG. 5*b* also shows a second row of mats 20*a*, connected to the first row of mats 20*a* by matching connectors 23', 23". It is evident that the due to the higher weight of the rope connection, the tubes 11*a'* will arrange near the water level. It is at these points (connection of tubes 11*a'* to the end grids 7*a*) where the connectors 23*a* are most suitably arranged.

In a variant (see also FIG. 4), one of the two faces of each mat is not grid-shaped, but is made of an oil-impervious sheet. In this embodiment, mats can be placed e.g. on a beach or other coastal area which is not yet contaminated. When spilt oil is later washed ashore by wave and wind action, it will be absorbed by such mats covering the beach, and will not contaminate the beach. Suitably, each mat has a feature by which it can be fastened to the ground, or a weight can be attached to, so that the waves may not too easily lift the mats, or at least the row of mats positioned farthest into the water.

The oil-filled modules or mats can be recollected and removed from the water surface, significantly reducing the amount of oil present on the water. The modules or mats may be burnt together with the oil, in order to use the thermal energy so released. In order to provide for clean burning, no halogenated polymer should be used in the manufacturing of the modules and mats, although the use of polyolefins as explained above is not always strictly necessary.

The strip-shaped (or chip-shaped) oil absorbent material accommodated in the cage as described above in some embodiments has the following structure: The strips (or chips, respectively) are obtained by cutting from a web-like melt-blown sheet of entangled (non-woven) polypropylene (or polyethylene) fibers. In this manner, the strips or chips are bound to accommodate a substantial volume proportion of air, which is not displaced when the strips are put in water because of the hydrophobicity of the fibers and the smallness of the interstices between the individual fibers. When oil comes into contact with the strips or chips, however, the oil attaches to the fibers' surfaces and displaces the entrapped air. It is quite impossible to wash the adsorbed oil out of the strips with water alone and accordingly, the oil remains attached to the fibers. If desired, the oil-loaded absorber material can therefore be hauled out of the water together with the enclosing structure according to the present invention, and burnt or disposed of. Naturally, any connecting structure may be made of non-halogen-containing resins or metal. The same holds for ropes and rods used to tie modules together. It may be noted that the polyolefin material should not contain sizeable quantities of surfactant, as any such surfactant (above 2%, or above 0.1% by mass) would lower the contact angle of water and could possibly lead to a mere soaking of the fibrous material with water, thereby reducing the oil absorbing property of the material.

During the process of absorbing oil, the buoyancy decreases as entrapped air is gradually displaced by the oil. Nevertheless, the buoyancy, which initially is high enough that the most part (one half to two thirds by volume) of the inventive structures floats above the water level, always remains sufficiently high that at most 80%-95% by volume sink below water level, depending to some extent on the type of oil. Furthermore, while initially the lower parts of the structures adsorb oil, during the process of adsorbing and, simultaneously, sinking, fresh parts of the absorber come into contact with the oil until the upper parts of the structures adsorb the remaining oil. Then, the structures can be removed from the water, or replaced with fresh modules.

The generally cylindrical modules according to FIGS. 1 and 2 can be used as a chain to be disposed around a marine oil spill site, some distance away from a coastline to protect the shore from wind drifted oil, or even across a river in an event where oil has been spilt on an upper part of the river and, under mainly gravitational forces, flows towards the sea. In all of these cases, it is also contemplated to connect, via matching connecting structure, cylindrical modules of the type of FIGS. 1 and 2 with mat-like modules of the type of FIG. 4 (but with a grid on both sides). For this to be readily done, the modules of FIGS. 1 and 2 may be provided with the corresponding male and female fasteners, and may be made of a matching size with the mats (see FIGS. 5a,b).

In another embodiment, mats similar to the above described type are formed with one edge being formed into an open-ended pouch 31 (FIGS. 6a,b). In this manner, a dragging (or holding) cable 33 of some length can be used to hold such mats 30 if slipped through the respective pouches 31. The mats 30 may be interconnected in the above described manner. Following the first row of mats, further mats as described before can be connected if required (not shown). The cable 33 can be held between two vehicles 35 (boats, automobiles, or even helicopters) moving slowly in water, on ice or on a beach, or lowly above either. E.g., in an area where a sizable tidal effect combines with a sloped beach, the area to be protected from drifting oil may be substantial. It is then more practical to move a small-sized mat array between two land vehicles at the speed of the moving tide rather than covering the entire beach with mats.

In order to reduce the friction the cable 33 may cause, it is also contemplated to place ball-like rolls 37 between some or all of the mats 30. Such balls 37 may be water-tight and may as such also be used as buoys when the cable/mat-system is used on water surfaces. In FIG. 6a, the pouches are chamfered 39 so as to provide space for the balls 37 (or rolls). The chamfering may be straight, or concavely curved so as to match the outer shape of the ball 37. The inner region 25a" of each mat is again stuffed with oil adsorbing material, and the outer rim 25a' is welded together on the remaining three sides. In FIG. 6a, the connectors 23b', 23b" between adjacent mats 30 are slightly different, in that they are mounted on common fixing points. In FIG. 6b, only the general positioning of the connectors 23b is indicated. There may be more connectors for further mat rows.

In arctic or subarctic areas, it is contemplated that such mat arrays are dragged over drift ice or even under drift ice, between two boats or ships, to remove spilt oil from on or below the ice, respectively. If a mat array is to be dragged under ice, it may be convenient to connect heavier balls between all or some of the mats on the cable, in order to overcome the buoyancy of the mats and bring at least the first row of mats under the ice. The following mats will then be pressed against the ice from below by their inherent buoyancy. Again, the balls between the mats will help reducing the friction caused by the cable dragging across the underside of the ice. Naturally, the distance between the dragging ships or boats should be adjusted to the cable length and depth of the ice.

A similar arrangement of heavier balls between adjacent mats may also be suitable when a mat array on a cable is used on a beach in protective manner, so as to keep the first row of mats under the waves and ensure that any oils carried ashore by the waves is thrown onto the mats from above, and not washed underneath.

A similar construction may be held across a river. If necessary, the cable can be additionally held by buoys in the middle of the river, to help withstand the dragging forces. In this event, where boat traffic is supposed to occur, there may be two cables in succession, each of which extends from another bank, with some overlap (as seen along the length of the river) in between through which gap the boat traffic is led. Where oil has been spilt on a narrow lake or canal, and both banks are accessible to land vehicles, it may be more convenient or simply faster to drag a mat array of the above-described type between two of such vehicles, along the length of the lake or canal, to gather at least a major portion of the spilt oil.

In yet another variant, plural mats according to the embodiment of FIG. 3 are tied together with one (or two) ropes slipped through one, two or more of the eyes 22 on one (or two opposing) edges of each mat. If on one rope, the mats are arranged close together, and on a second rope, spaces are left between the mats, the row of mats will form a curve. By adjusting the intervals suitably, it is possible to form a spiral (Archimedes-type) of mats, which is able to cover a near circular area e.g. on a small lake or pond on which an oil spill has occurred, with access to the water from only one spot on the banks. After the oil has been absorbed by the mats, the can be simply recollected in reverse fashion, by unraveling the spiral of mats from its outermost end. The bringing out and recollecting can be done manually or in an automated fashion. Stacks of pre-connected mats can be stored in advance, while the intervals between the mats on one of the ropes can be adjusted on-site as needed. With only one rope, a spiral-type mat arrangement can also be formed on-site, by successively slipping the rope through the eyes 22 on both opposing (inner and outer) edges of the mats.

Further modifications or variations will be readily contemplated by the skilled person, without departing from the scope of present invention as set out in the appended claims. E.g., although the modules have been described with end grids rigidly connected in pairs, it is also contemplated to provide the disks in a more continuous fashion on a central rope, by sufficiently urging the disks together in a lengthwise direction that they do not substantially tilt from their intended vertical orientation. Also, although the mats have been shown to be more or less square, it is also contemplated to use trigonal or hexagonal shapes, both of which enable one to cover a plane without gaps. Still further, although the absorbent material has been disclosed as strip-like or chip-like, it is also contemplated that it may consist of pointed, star-like bodies, as long as the individual bodies maintain sufficiently large interstices between them so that the water may readily pass through to bring the oil to the absorbent bodies. Even a sufficiently coarsely porous structure is within the scope of present invention.

What is claimed:

1. A floatable modular device for absorbing oil from a surface, comprising:
   a plurality of generally disk-shaped floatable individual cages, wherein each cage has two faces and each face tapers towards the cage's periphery in a peripheral region thereof; and
   a water-repellent strip-shaped or chip-shaped oil absorbent material accommodated in the cage;
   wherein the device further includes connecting structure supporting the plurality of individual cages in a face-on manner forming a stack, along a common longitudinal axis, wherein the individual cages in the stack are oriented in parallel to one another, and wherein stacking the peripheral regions of the mutually adjacent individual cages forms a longitudinally corrugated structure;
   wherein the device further comprises at least one connector element configured for joining plural ones of the stack together, to form an articulate oil absorber.

2. The floatable modular device of claim 1, wherein the cages have generally round circumferences.

3. The floatable modular device of claim 1, wherein there are plural connector elements each configured to be joined with a corresponding connector element of an adjacent, like stack in a coplanar, edge-on fashion, to form a one- or two-dimensional array, in which each modular device has a generally polygonal disk shape.

4. The floatable modular device of claim 3, wherein the plural connector elements are attached lengthwise on an outer peripheral rim of the cage.

5. The floatable modular device of claim 3, wherein one edge of the plurality of edges of the polygonal generally disk-shaped device is formed into an open-ended pouch for accommodating a connecting cable or rod.

6. The floatable modular device of claim 3, wherein the connecting structure is provided in a central region of the generally disk-shaped floatable cage, wherein the connecting structure fastens opposing faces of the cage to one another.

7. The floatable modular device of claim 1, wherein the connecting structure includes a central opening operable to receive a connecting rod, tube, or rope.

8. The floatable modular device of claim 7, wherein the at least one connector element is configured to connect a top or bottom of the stack to a bottom or top, respectively, of an adjacent, like stack in an end-on fashion.

9. The floatable modular device of claim 8, wherein at least on stack is connected to at least one additional stack in an end-on fashion by a cushion interposed side-on between the stacks in the longitudinal direction of the connected stacks, and between the connecting structures.

10. The floatable modular device of claim 9, wherein the cushion is composed of one cage, or a plurality of mutually connected cages.

11. The stack floatable modular device of claim 8, wherein the at least one connector element includes one or more ropes and hook fasteners.

12. The floatable modular device of claim 3, wherein mutually connected adjacent stacks are folded upon one another in a direction transverse to the plane of the modular device before use.

13. The floatable modular device of claim 3, wherein the oil absorbing material is a fibrous polyolefin oil absorbent material, comprising strips or chips cut from a melt-blown master web of polyolefin fibers, wherein the strips or chips have a longitudinal extension of between 1 and 12 cm, a width extension of between 2 and 25 mm, and a thickness extension of between 1 and 5 mm.

14. The floatable modular device of claim 1, wherein the oil absorbing material is a fibrous polyolefin oil absorbent material, comprising strips or chips cut from a melt-blown master web of poly-olefin fibers, wherein the strips or chips have a longitudinal extension of between 1 and 12 cm, a width extension of between 2 and 25 mm, and a thickness extension of between 1 and 5 mm.

15. The floatable modular device of claim 14, wherein the polyolefin is selected from polyethylene and polypropylene and mixtures thereof.

16. The floatable modular device of claim 14, wherein the master web has an area density of between 100 $g/m^2$ and 500 $g/m^2$.

17. The floatable modular device of claim 14, wherein an aspect ratio of the strips is between 10 and 1000.

18. The floatable modular device of claim 14, wherein a cross-section of the strips has a degree of circularity of between 0.1 and 0.99.

19. A method of manufacturing the floatable modular device of claim 1, the method comprising:
   providing a first, grid-like sheet made of plastics;
   positioning a water-repellent strip-shaped or chip-shaped oil absorbent material on the first grid-like sheet;
   positioning a second sheet on the oil absorbent material; and
   welding the first and second sheets together at their peripheries, with the oil absorbent material in between, wherein peripheral regions of the first and second sheets are bent towards one another, wherein a central opening is punched into the device after, or concurrently with, the welding step, and a rod or tube is inserted into the opening.

20. The method of claim 19, wherein the method further comprises mounting plural devices in a face-on manner as a stack on the rod or tube.

* * * * *